(12) United States Patent
Lin et al.

(10) Patent No.: US 11,442,585 B2
(45) Date of Patent: *Sep. 13, 2022

(54) TOUCH DISPLAY MODULE, ELECTRONIC APPARATUS, AND TOUCH POSITION DETECTION METHOD

(71) Applicant: TPK Touch Solutions (Xiamen) Inc., Fujian (CN)

(72) Inventors: Mingchuan Lin, Taichung (TW); Wenhung Wang, Taichung (TW); Chuan Chih Fu, Taichung (TW); Tai Shih Cheng, Taipei (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,761

(22) Filed: Oct. 5, 2020

(65) Prior Publication Data
US 2022/0107705 A1    Apr. 7, 2022

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 3/0448* (2019.05)

(58) Field of Classification Search
None
See application file for complete search history.

(56) References Cited

U.S. PATENT DOCUMENTS

| | | | | |
|---|---|---|---|---|
| 9,141,224 B1* | 9/2015 | Rowe | .................... | G06F 3/0443 |
| 2008/0246496 A1* | 10/2008 | Hristov | ................. | G06F 3/0446 |
| | | | | 324/686 |
| 2009/0073135 A1* | 3/2009 | Lin | ........................ | G06F 3/0448 |
| | | | | 345/173 |
| 2011/0279406 A1* | 11/2011 | Kawaguchi | ........... | G06F 3/0448 |
| | | | | 345/174 |
| 2012/0113071 A1* | 5/2012 | Kawaguchi | ........... | G06F 3/0443 |
| | | | | 345/204 |
| 2015/0009421 A1* | 1/2015 | Choi | ..................... | G06F 3/0443 |
| | | | | 349/12 |
| 2016/0077640 A1* | 3/2016 | Brinkley | ........... | G02F 1/133512 |
| | | | | 345/173 |
| 2019/0056815 A1 | 2/2019 | Fan et al. | | |

(Continued)

FOREIGN PATENT DOCUMENTS

TW    201520838 A    6/2015
TW    201818214 A    5/2018
TW    I699677 B      7/2020

*Primary Examiner* — Duane N Taylor, Jr.
(74) *Attorney, Agent, or Firm* — Cooper Legal Group, LLC (57) ABSTRACT

A touch display module includes a display panel and a touch sensing layer. The touch sensing layer is embedded in the display panel and includes a plurality of sensing electrode groups. The sensing electrode groups are sequentially arranged along a first axial direction. One of the sensing electrode groups includes a first electrode block, a second electrode block, and a third electrode block spaced apart from each other. The first electrode block is located at a same side of the second electrode block and the third electrode block in the first axial direction and is located between the second electrode block and the third electrode block in a second axial direction perpendicular to the first axial direction.

20 Claims, 12 Drawing Sheets

(56) References Cited

U.S. PATENT DOCUMENTS

| | | | |
|---|---|---|---|
| 2019/0163003 A1* | 5/2019 | Kim | G02F 1/1333 |
| 2020/0064973 A1* | 2/2020 | Mitsui | B32B 3/08 |
| 2021/0256237 A1* | 8/2021 | Kim | G06K 9/0002 |

* cited by examiner

TOUCH DISPLAY MODULE, ELECTRONIC APPARATUS, AND TOUCH POSITION DETECTION METHOD

BACKGROUND

Technical Field

The present disclosure relates to a touch display module, an electronic apparatus, and a touch position detection method.

Description of Related Art

In-cell touch technology can fabricate a touch module inside a display, so that the overall device has the advantages of lightness and high brightness. The operating principle of a common in-cell touch display on the market is to perform self-capacitive touch sensing through multiple rectangular touch electrodes arranged in a matrix inside the touch display. Each touch electrode needs a separate trace to transmit a sensing result of the touch electrode to a touch chip.

However, with the increasing demand for touch resolution, the number of channels of a common touch chip is not enough to support this design method, and the touch electrodes are easily short-circuited due to the large and dense traces.

Accordingly, how to provide an electronic apparatus to solve the aforementioned problems becomes an important issue to be solved by those in the industry.

SUMMARY

An aspect of the disclosure is to provide a touch display module that can efficiently solve the aforementioned problems.

According to an embodiment of the disclosure, a touch display module includes a display panel and a touch sensing layer. The touch sensing layer is embedded in the display panel and includes a plurality of sensing electrode groups. The sensing electrode groups are sequentially arranged along a first axial direction. One of the sensing electrode groups includes a first electrode block, a second electrode block, and a third electrode block spaced apart from each other. The first electrode block is located at a same side of the second electrode block and the third electrode block in the first axial direction and is located between the second electrode block and the third electrode block in a second axial direction perpendicular to the first axial direction.

In an embodiment of the disclosure, the display panel has a viewable area. The second electrode block and the third electrode block extend toward each other respectively from opposite two edges of the viewable area.

In an embodiment of the disclosure, the first electrode block and the second electrode block form a first gap therebetween. The first electrode block and the third electrode block form a second gap therebetween. Extending directions of the first gap and the second gap are inclined relative to the first axial direction and the second axial direction.

In an embodiment of the disclosure, an end of the first gap is connected to an end of the second gap.

In an embodiment of the disclosure, a contour of at least one of the first gap or the second gap is jagged.

In an embodiment of the disclosure, the display panel has a viewable area. The one of the sensing electrode groups further includes two conductive extending portions. The two conductive extending portions are connected to one of the first electrode block, the second electrode block, or the third electrode block and extended outside the viewable area.

In an embodiment of the disclosure, the one of the sensing electrode groups further includes a fourth electrode block. The fourth electrode block is located between the second electrode block and the third electrode block in the second axial direction. The second electrode block and the third electrode block are located between the first electrode block and the fourth electrode block in the first axial direction.

In an embodiment of the disclosure, the first electrode block, the second electrode block, the third electrode block, and the fourth electrode block are arranged in a ring shape.

In an embodiment of the disclosure, a peripheral contour of at least one of the first electrode block, the second electrode block, or the third electrode block is substantially triangular.

In an embodiment of the disclosure, orthogonal projections of all sub-pixels of the display panel projected on the touch sensing layer are within ranges of the sensing electrode groups.

In an embodiment of the disclosure, the display panel is a liquid crystal display panel or an organic light-emitting diode display panel.

According to an embodiment of the disclosure, an electronic apparatus includes the foregoing touch display module and a cover plate. The cover plate is disposed on the touch display module.

According to an embodiment of the disclosure, a touch position detection method is applied to an electronic apparatus including a plurality of sensing electrode groups. The sensing electrode groups are sequentially arranged along a first axial direction and each including a first electrode block, a second electrode block, and a third electrode block spaced apart from each other. The first electrode block is located at a same side of the second electrode block and the third electrode block in the first axial direction and is located between the second electrode block and the third electrode block in a second axial direction perpendicular to the first axial direction. The touch position detection method includes: obtaining a first axis coordinate of a touch point in the first axial direction according to one of the sensing electrode groups with a capacitance change; and calculating a second axis coordinate of the touch point in the second axial direction according to capacitance changes of at least two of the first electrode block, the second electrode block, or the third electrode block of the one of the sensing electrode groups.

In an embodiment of the disclosure, the step of calculating the second axis coordinate includes: determining whether the second electrode block and the third electrode block have capacitance changes at the same time; if the second electrode block and the third electrode block have the capacitance changes at the same time, calculating the second axis coordinate according to the capacitance changes of the first electrode block, the second electrode block, and the third electrode block; and if the second electrode block and the third electrode block do not have the capacitance changes at the same time, calculating the second axis coordinate according to the capacitance changes of the first electrode block and the second electrode block or the capacitance changes of the first electrode block and the third electrode block.

Accordingly, in the touch display module of the present disclosure, the touch sensing layer embedded in the display panel includes the plurality of sensing electrode groups sequentially arranged along the first axial direction, and each of the sensing electrode groups includes the first electrode block, the second electrode block, and the third electrode block that are separated and arranged alternately in the second axial direction. In this way, compared to a conventional in-cell touch display with a plurality of rectangular touch electrodes arranged in a matrix, the electronic apparatus of the present disclosure can greatly reduce the number of traces from the touch sensing layer to the control circuit, thereby helping simplify the design of the touch chip, reduce the risk of short circuit between the electrode blocks of the touch sensing layer, and improve product reliability. In addition, since the number of the traces used is small, the touch sensing layer does not need to be coupled to the traces through via holes, which helps simplify the manufacturing processes and improve the production yield.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
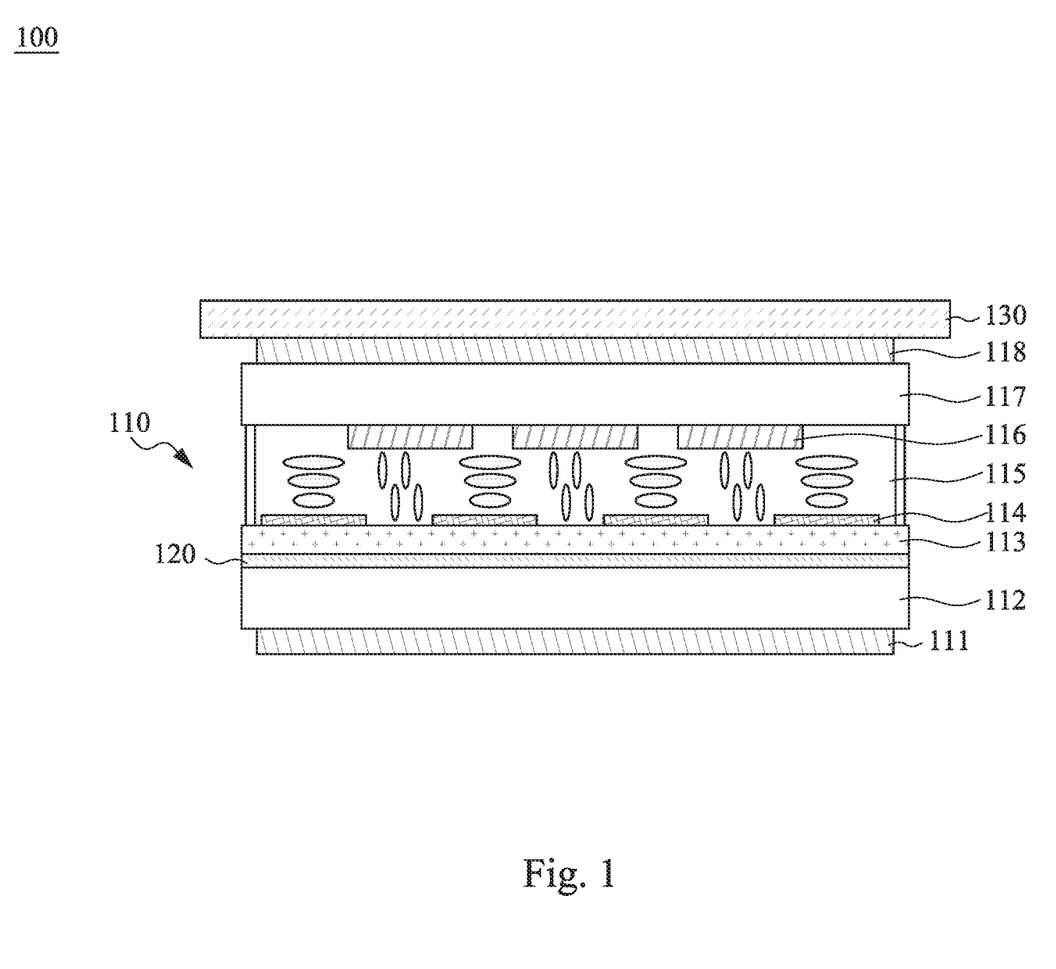
FIG. 1 is a cross-sectional view of an electronic apparatus according to an embodiment of the disclosure.

Reference is made to FIG. 1. FIG. 1 is a cross-sectional view of an electronic apparatus 100 according to an embodiment of the disclosure. As shown in FIG. 1, in the present embodiment, the electronic apparatus 100 includes a touch display module and a cover plate 130. The cover plate 130 is disposed on the touch display module. A material of the cover plate 130 includes glass, for example. The touch display module includes a display panel 110 and a touch sensing layer 120. The touch sensing layer 120 is embedded in the display panel 110. The display panel 110 includes a first polarizing layer 111, a lower substrate 112, an insulating layer 113, a thin film transistor layer 114, a liquid crystal layer 115, a plurality of color filters 116, an upper substrate 117, and a second polarizing layer 118 in order from bottom to top. Specifically, the touch sensing layer 120 is embedded between the lower substrate 112 and the insulating layer 113. In other words, the display panel 110 of the present embodiment is a liquid crystal display panel, but the disclosure is not limited in this regard.

Figure 2:
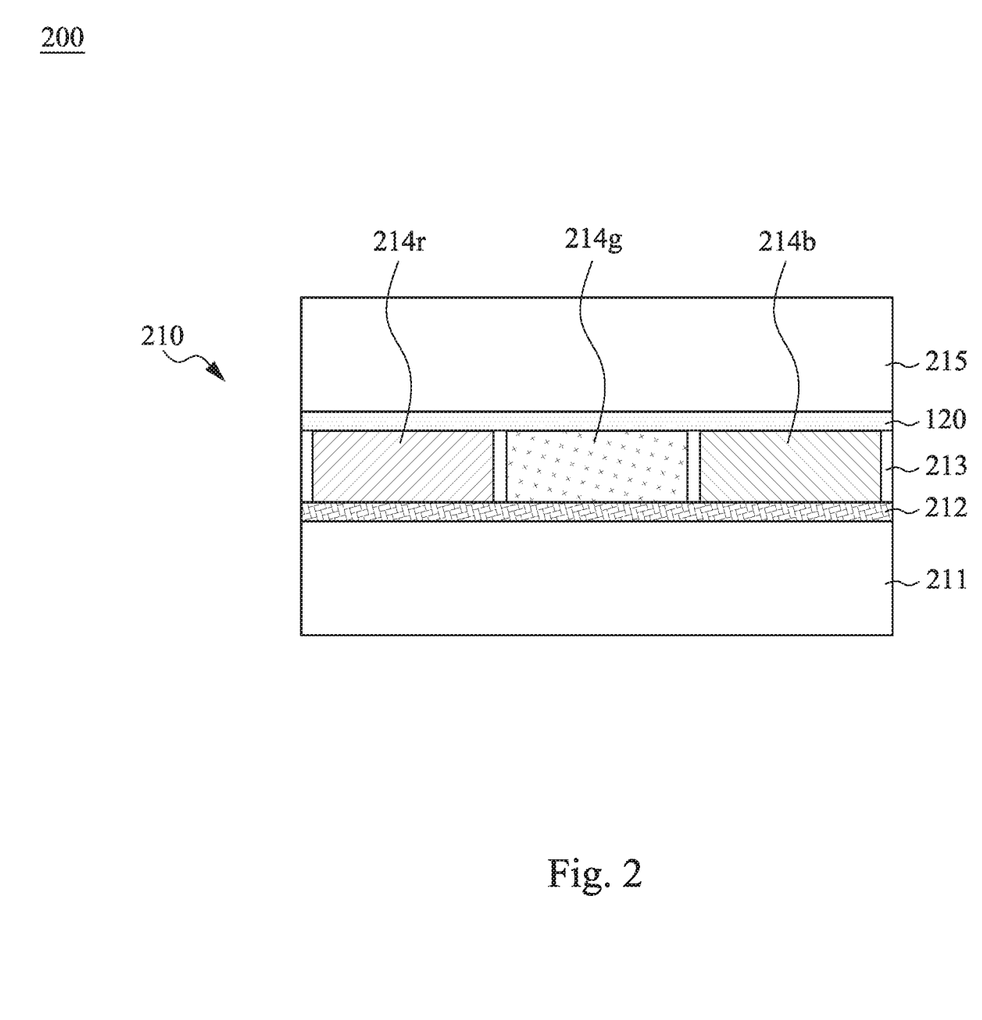
FIG. 2 is a cross-sectional view of an electronic apparatus according to another embodiment of the disclosure.

Reference is made to FIG. 2. FIG. 2 is a cross-sectional view of an electronic apparatus 200 according to another embodiment of the disclosure. As shown in FIG. 2, in the present embodiment, the electronic apparatus 200 includes a display panel 210 and a touch sensing layer 120. The touch sensing layer 120 is embedded in the display panel 210. The display panel 210 includes a lower substrate 211, a metal conductive layer 212, a plurality of organic light emitting layers 214r, 214g, 214b embedded in an insulating layer 213, and an upper substrate 215 in order from bottom to top. Specifically, the touch sensing layer 120 is embedded between the organic light emitting layers 214r, 214g, 214b and the upper substrate 215. In other words, the display panel 210 of the present embodiment is an organic light-emitting diode display panel. In another embodiment, the positions of the metal conductive layer 212 and the touch sensing layer 120 can be interchanged.

In some embodiments, the electronic apparatus 100 or 200 can be a smart phone, a tablet computer, or a notebook computer, but the disclosure is not limited in this regard.

Figure 3:
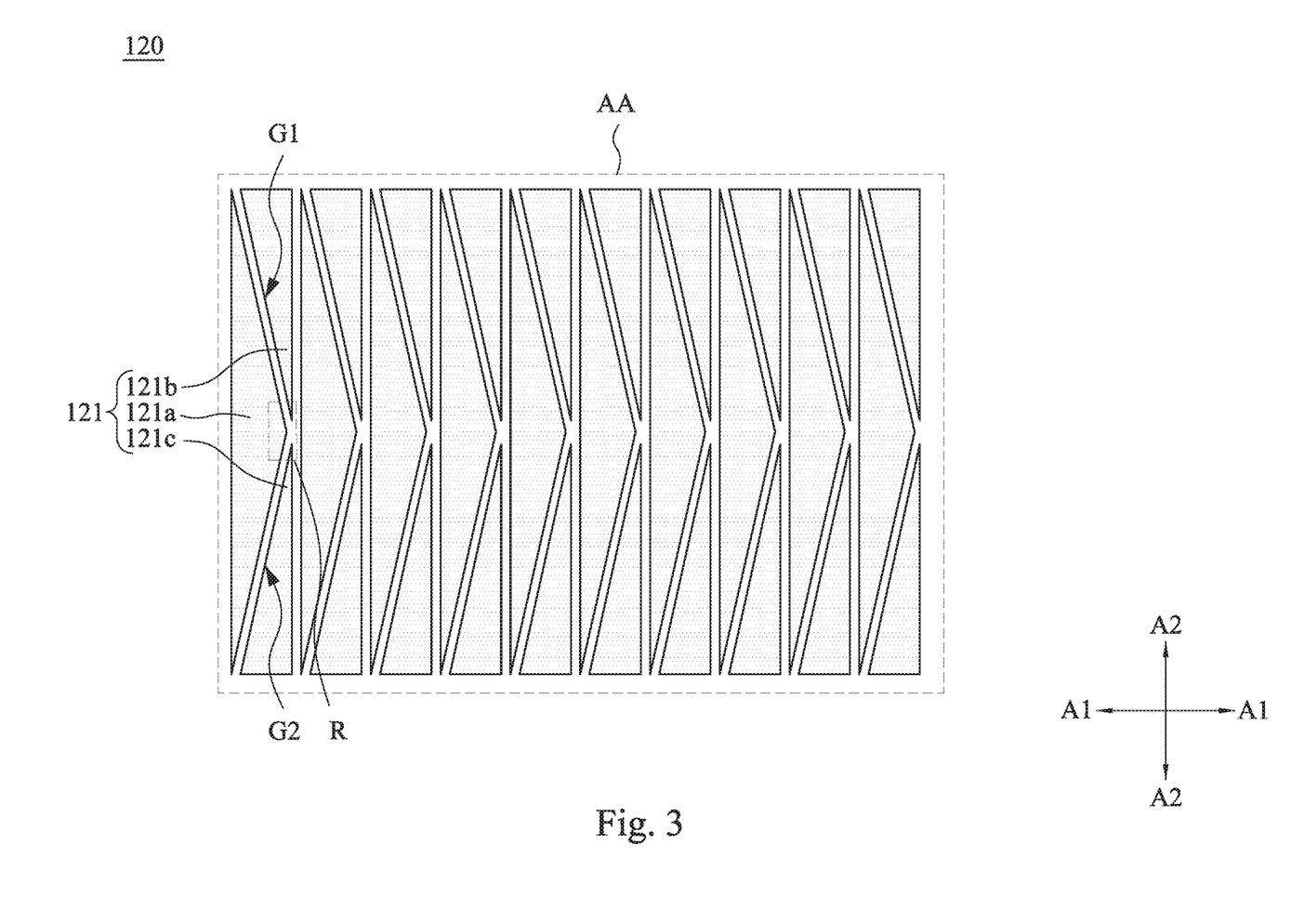
FIG. 3 is a front view of an embodiment of a touch sensing layer in FIG. 1.

Reference is made to FIG. 3. FIG. 3 is a front view of an embodiment of the touch sensing layer 120 in FIG. 1. As shown in FIG. 3, in the present embodiment, the touch sensing layer 120 includes a plurality of sensing electrode groups 121. The sensing electrode groups 121 are sequentially arranged along a first axial direction A1. Each of the sensing electrode groups 121 includes a first electrode block 121a, a second electrode block 121b, and a third electrode block 121c spaced apart from each other. The first electrode block 121a is located at a same side of the second electrode block 121b and the third electrode block 121c in the first axial direction A1, and the first electrode block 121a is located between the second electrode block 121b and the third electrode block 121c in a second axial direction A2 perpendicular to the first axial direction A1.

Specifically, as shown in FIG. 3, the display panel 110 has a viewable area AA. The second electrode block 121b and the third electrode block 121c extend toward each other respectively from opposite two edges (e.g., the upper edge and the lower edge) of the viewable area AA. In other words, each of the sensing electrode groups 121 extends to the upper and lower edges of the viewable area AA in the second axial direction A2.

The first electrode block 121a and the second electrode block 121b form a first gap G1 therebetween. The first electrode block 121a and the third electrode block 121c form a second gap G2 therebetween. Extending directions (i.e., a longest dimension) of the first gap G1 and the second gap G2 are inclined relative to the first axial direction A1 and the second axial direction A2. Hence, widths of the first electrode block 121a, the second electrode block 121b, and the third electrode block 121c in the first axial direction A1 can be changed (i.e., vary) along the second axial direction A2. In some embodiments, as shown in FIG. 3, the width of the first electrode block 121a in the first axial direction A1 increases first and then decreases along the second axial direction A2 from top to bottom. The width of the second electrode block 121b in the first axial direction A1 gradually decreases from top to bottom along the second axial direction A2. The width of the third electrode block 121c in the first axial direction A1 gradually increases from top to bottom along the second axial direction A2.

In some embodiments, as shown in FIG. 3, the first gap G1 and the second gap G2 extend straight (i.e., extend linearly), and one end of the first gap G1 is connected to one end of the second gap G2, so that peripheral contours of the first electrode block 121a, the second electrode block 121b, and the third electrode block 121c are substantially triangular. For example, as shown in FIG. 3, the peripheral contour of the first electrode block 121a is an isosceles triangle, and the peripheral contours of the second electrode block 121b and the third electrode block 121c are right triangles. From another perspective, the first electrode block 121a, the second electrode block 121b, and the third electrode block 121c can be pieced together to form a rectangle.

The peripheral contours of the first electrode block 121a, the second electrode block 121b, and the third electrode block 121c are not limited to the above-mentioned embodiments. In practical applications, it is possible that only one or two of the peripheral contours of the first electrode block 121a, the second electrode block 121b, and the third electrode block 121c are substantially triangular. For example, in some embodiments, the peripheral contours of the second electrode block 121b and the third electrode block 121c are in the shape of right triangles, and the peripheral contour of the first electrode block 121a is in the shape of a parallelogram (for example, by mirroring the third electrode block 121c in FIG. 3 in the first axial direction A1). In some other embodiments, the peripheral contour of the first electrode block 121a is triangular, and the peripheral contour of at least one of the second electrode block 121b or the third electrode block 121c is trapezoidal (for example, by reducing the length of the first electrode block 121a in the first axial direction A1).

Figure 4:
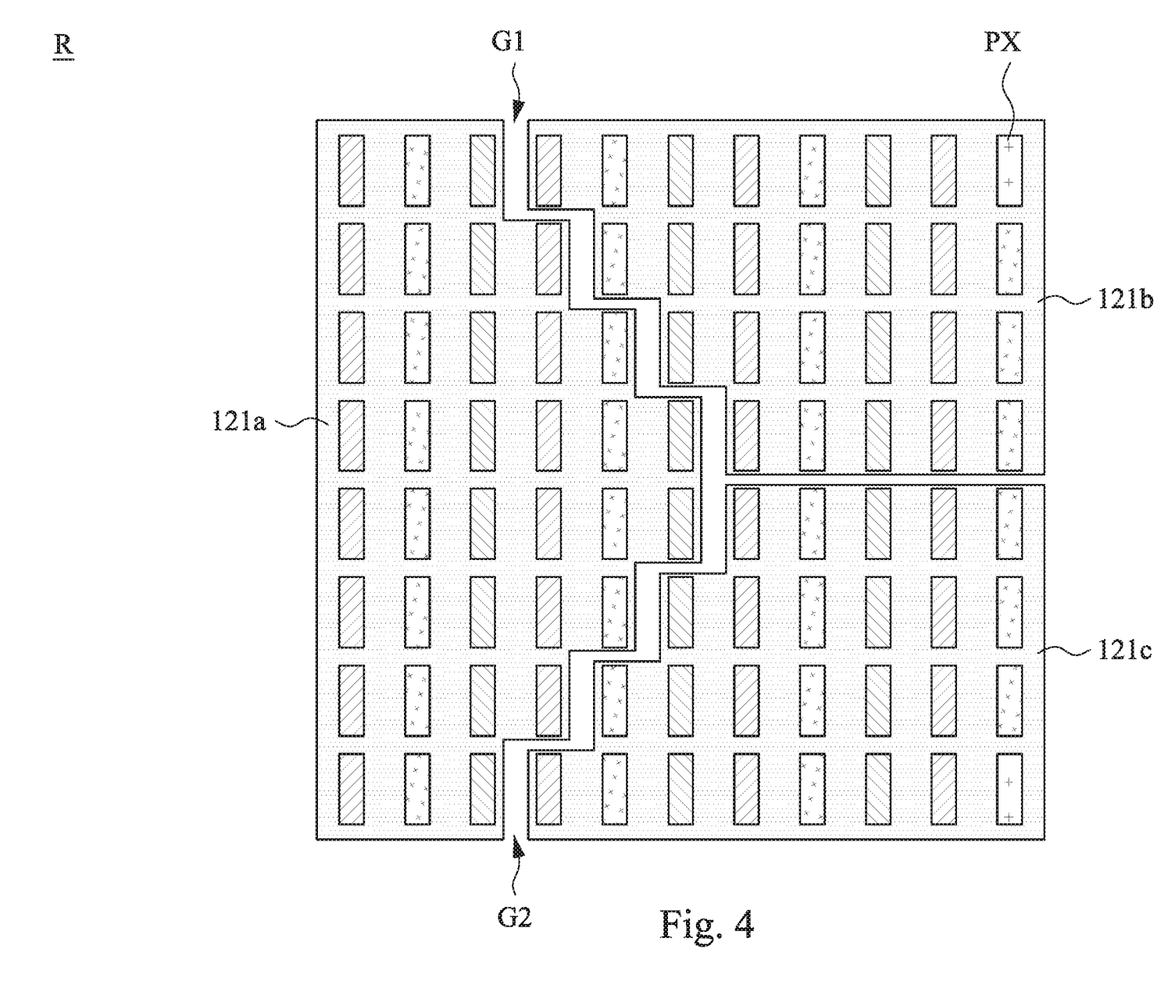
FIG. 4 is an enlarged view of a partial area of FIG. 3.

Reference is made to FIG. 4. FIG. 4 is an enlarged view of a partial area R of FIG. 3. As shown in FIG. 4, in the present embodiment, the display panel 110 includes a plurality of sub-pixels PX arranged in the viewable area AA. The three types of sub-pixels PX depicted in FIG. 3 can be used to emit red light, green light, and blue light respectively, but the color arrangement and combination of the sub-pixels PX of the present disclosure are not limited in this regard. It should be pointed out that orthogonal projections of all the sub-pixels PX of the display panel 110 projected on the touch sensing layer 120 are within ranges (e.g., enclosed within peripheral contours) of the sensing electrode groups 121. In other words, the touch sensing layer 120 covers the area of all the sub-pixels PX. In order to achieve the foregoing purpose, a contour of at least one of the first gap G1 between the first electrode block 121a and the second electrode block 121b or the second gap G2 between the first electrode block 121a and the third electrode block 121c is jagged.

Figure 5:
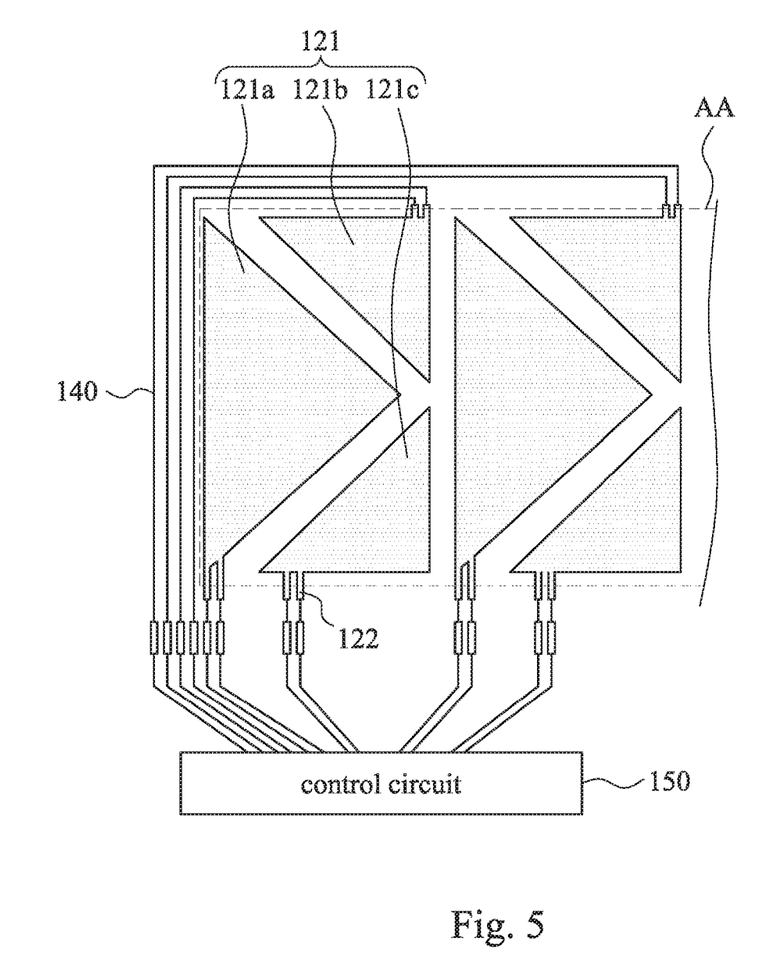
FIG. 5 is a functional block diagram of an embodiment of the electronic apparatus.

Reference is made to FIG. 5. FIG. 5 is a functional block diagram of an embodiment of the electronic apparatus 100 or 200. As shown in FIG. 5, in the present embodiment, the electronic apparatus 100 or 200 has a self-capacitive touch function and further includes a control circuit 150 and a plurality of traces 140. Each of the sensing electrode groups 121 further includes a plurality of conductive extending portions 122. Each of the conductive extending portions 122 is connected to one of the first electrode block 121a, the second electrode block 121b, or the third electrode block 121c and extends outside the viewable area AA. Each of the conductive extending portions 122 is then connected to the control circuit 150 through a corresponding one of the traces 140.

The capacitance value of each of the sensing electrode groups 121 changes according to a touch input, in which the touch input can be a user approaching the electronic apparatus 100 or 200 with a finger. The change in capacitance value of the sensing electrode group 121 is transmitted to the control circuit 150 through the trace 140, and the control circuit 150 is used to calculate the position of the touch input in the first axial direction A1 and the second axial direction A2 according to the received change in capacitance value.

In some embodiments, the first electrode block 121a, the second electrode block 121b, the third electrode block 121c, and the conductive extending portions 122 of the sensing electrode group 121 are all made of the same material. As shown in FIG. 5, each of the conductive extending portions 122 is located at a side of the sensing electrode group 121 adjacent to an edge of the viewable area AA so as to easily extend outside the viewable area AA. In some embodiments, each of the first electrode block 121a, the second electrode block 121b, and the third electrode block 121c is connected to two conductive extending portions 122, so as to avoid a problem that might occur if a certain one of the conductive extending portions 122 is disconnected during the manufacturing process of the touch sensing layer 120 and cannot transmit the capacitance signal of the first electrode block 121a, the second electrode block 121b, or the third electrode block 121c to the control circuit 150 via the trace 140. In other words, the foregoing approach can increase reliability and reduce impedance. In some embodiments, the first electrode block 121a, the second electrode block 121b, and the third electrode block 121c may each be connected to more than two conductive extending portions 122.

Figure 6:
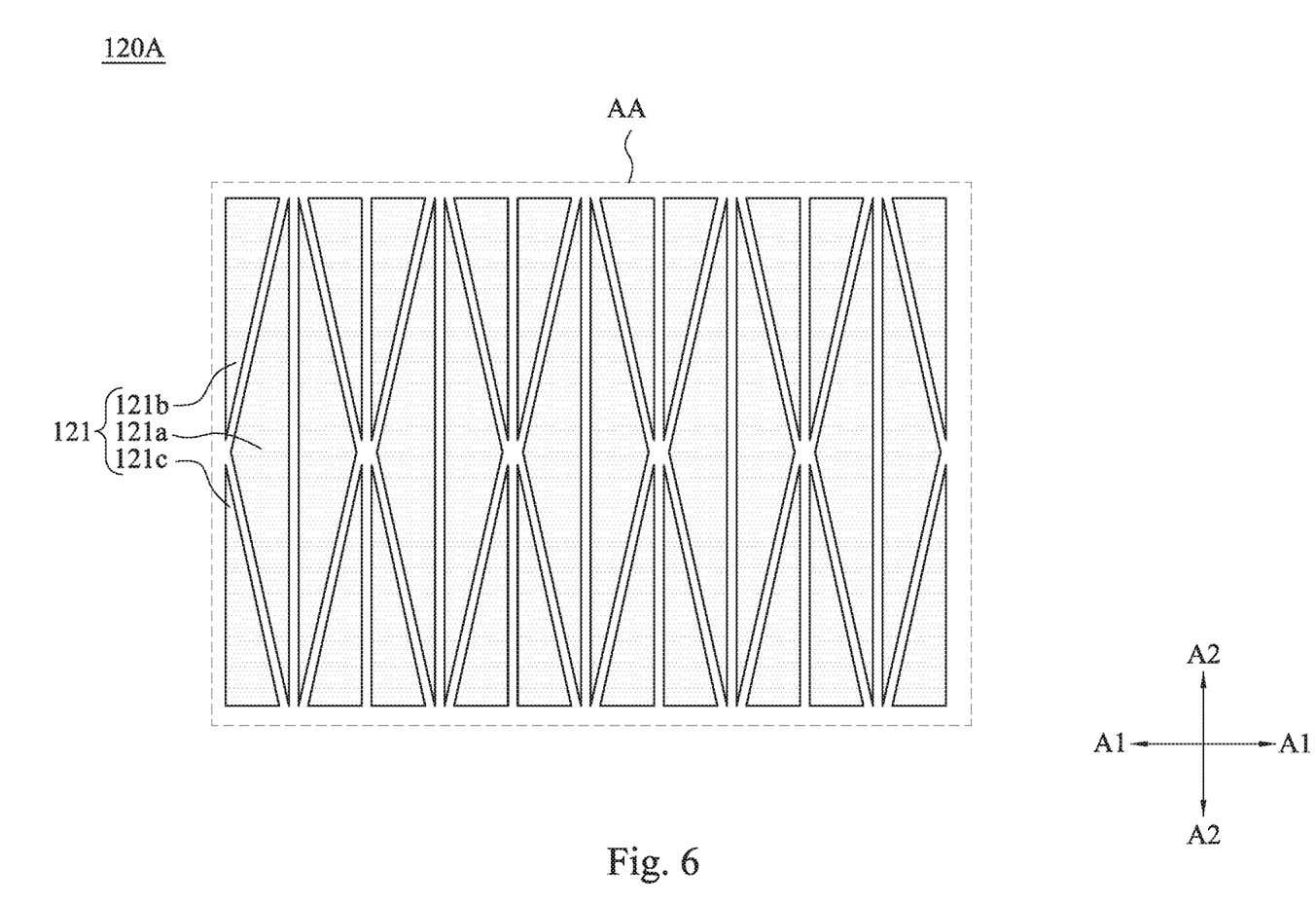
FIG. 6 is a front view of a touch sensing layer according to another embodiment of the disclosure.

Reference is made to FIG. 6. FIG. 6 is a front view of a touch sensing layer 120A according to another embodiment of the disclosure. As shown in FIG. 6, in the present embodiment, the touch sensing layer 120A also includes the sensing electrode groups 121 that are sequentially arranged along the first axial direction A1. Compared to the touch sensing layer 120 shown in FIG. 3, the present embodiment modifies the arrangement of the first electrode block 121a, the second electrode block 121b, and the third electrode block 121c in some of the sensing electrode groups 121 of the touch sensing layer 120A. Specifically, the arrangement of the first electrode block 121a, the second electrode block 121b, and the third electrode block 121c of each of the sensing electrode groups 121 in FIG. 3 is the same. The arrangements of the first electrode block 121a, the second electrode block 121b, and the third electrode block 121c of any adjacent two of the sensing electrode groups 121 in FIG. 6 are symmetrical along the first axial direction A1.

Figure 7:
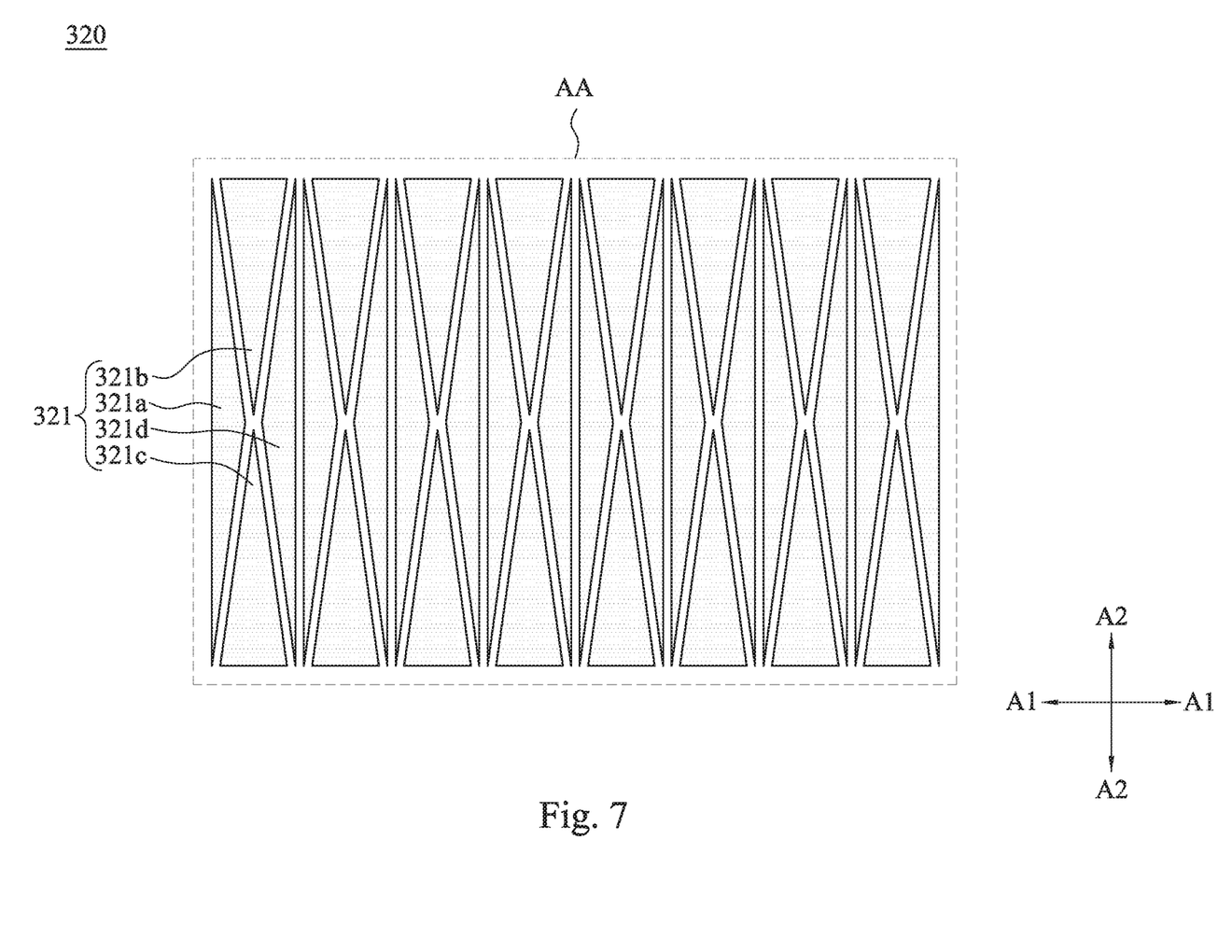
FIG. 7 is a front view of a touch sensing layer according to another embodiment of the disclosure.
Figure 8:
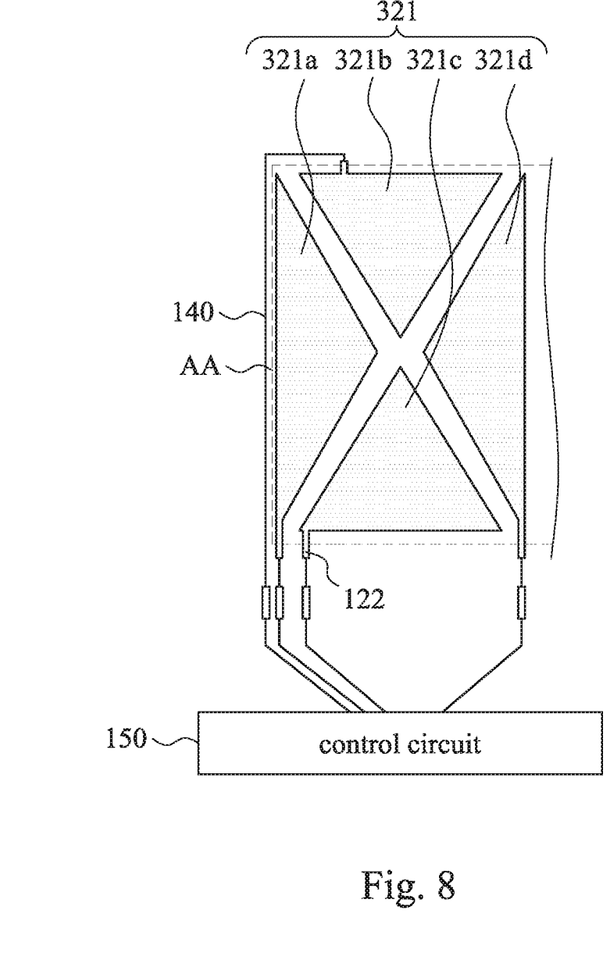
FIG. 8 is a functional block diagram of another embodiment of the electronic apparatus.

Reference is made to FIGS. 7 and 8. FIG. 7 is a front view of a touch sensing layer 320 according to another embodiment of the disclosure. FIG. 8 is a functional block diagram of another embodiment of the electronic apparatus 100 or 200. As shown in FIGS. 7 and 8, in the present embodiment, the touch sensing layer 320 also includes the sensing electrode groups 321 that are sequentially arranged along the first axial direction A1. Compared to the touch sensing layer 120 shown in FIG. 3, the present embodiment increases the number of the electrode blocks included in each of the sensing electrode groups 121. Specifically, in the present embodiment, each of the sensing electrode groups 321 includes a first electrode block 321a, a second electrode block 321b, a third electrode block 321c, and a fourth electrode block 321d. The fourth electrode block 321d is located between the second electrode block 321b and the third electrode block 321c in the second axial direction A2. The second electrode block 321b and the third electrode block 321c are located between the first electrode block 321a and the fourth electrode block 321d in the first axial direction A1. Furthermore, the first electrode block 321a, the second electrode block 321b, the third electrode block 321c, and the fourth electrode block 321d are arranged in a ring shape. Each of the first electrode block 321a, the second electrode block 321b, the third electrode block 321c, and the fourth electrode block 321d may be connected to one or more conductive extending portions 122 crossing outside the viewable area AA and may be connected to the control circuit 150 through the trace 140.

Figure 9:
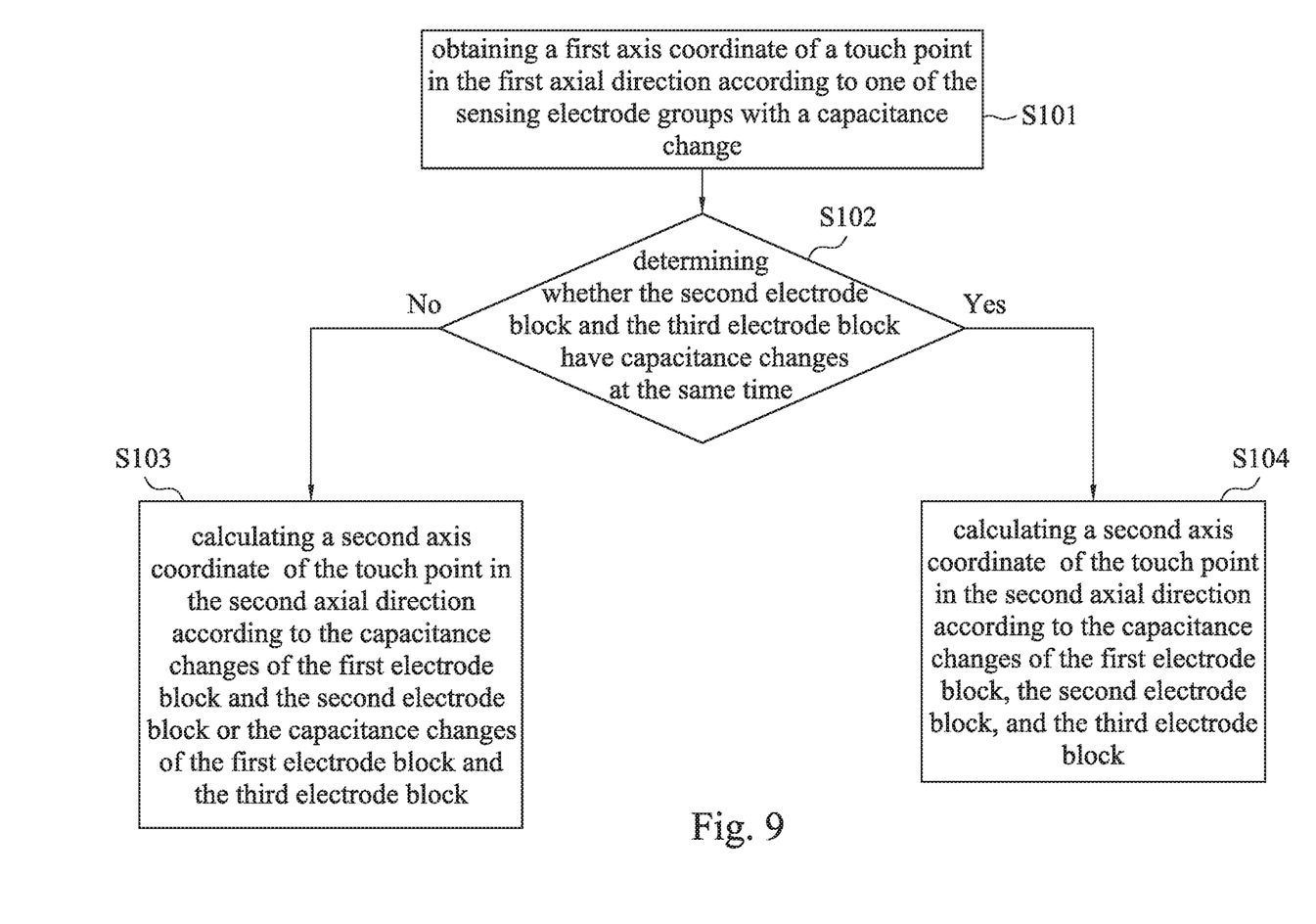
FIG. 9 is a flowchart of a touch position detection method according to an embodiment of the disclosure.

Reference is made to FIG. 9. FIG. 9 is a flowchart of a touch position detection method according to an embodiment of the disclosure. As shown in FIG. 9, in the present embodiment, the touch position detection method mainly includes steps S101 to S104, and the touch position detection method can be applied to the electronic apparatus 100 or 200 including the plurality of sensing electrode groups 121. As mentioned above, the sensing electrode groups 121 are sequentially arranged along the first axial direction A1, and each sensing electrode groups 121 includes the first electrode block 121a, the second electrode block 121b, and the third electrode block 121c spaced apart from each other. The first electrode block 121a is located at a same side of the second electrode block 121b and the third electrode block 121c in the first axial direction A1, and the first electrode block 121a is located between the second electrode block 121b and the third electrode block 121c in the second axial direction A2. For example, the touch position detection method can be executed by the control circuit 150.

In step S101, a first axis coordinate of a touch point in the first axial direction A1 is obtained according to one of the sensing electrode groups 121 with a capacitance change.

With reference to FIG. 3, when the touch point is located at a certain one of the sensing electrode groups 121, only this sensing electrode group 121 will produce a capacitance change, while other sensing electrode groups 121 will not produce a capacitance change. Since the sensing electrode groups 121 are sequentially arranged along the first axial direction A1, the control circuit 150 can learn (e.g., determine) the first axis coordinate represented by the sensing electrode group 121 having the capacitance change according to the position thereof.

After the first axis coordinate of the touch point in the first axial direction A1 is determined, steps S102 to S104 can be performed to calculate the second axis coordinate of the touch point in the second axial direction A2.

In step S102, whether the second electrode block 121b and the third electrode block 121c have capacitance changes at the same time is determined. If the second electrode block 121b and the third electrode block 121c have the capacitance changes at the same time (i.e., the determination result of step S102 is yes), step S104 is further performed according to the touch position detection method. If the second electrode block 121b and the third electrode block 121c do not have the capacitance changes at the same time (i.e., the determination result of step S102 is no), step S103 is further performed according to the touch position detection method.

Figure 10:
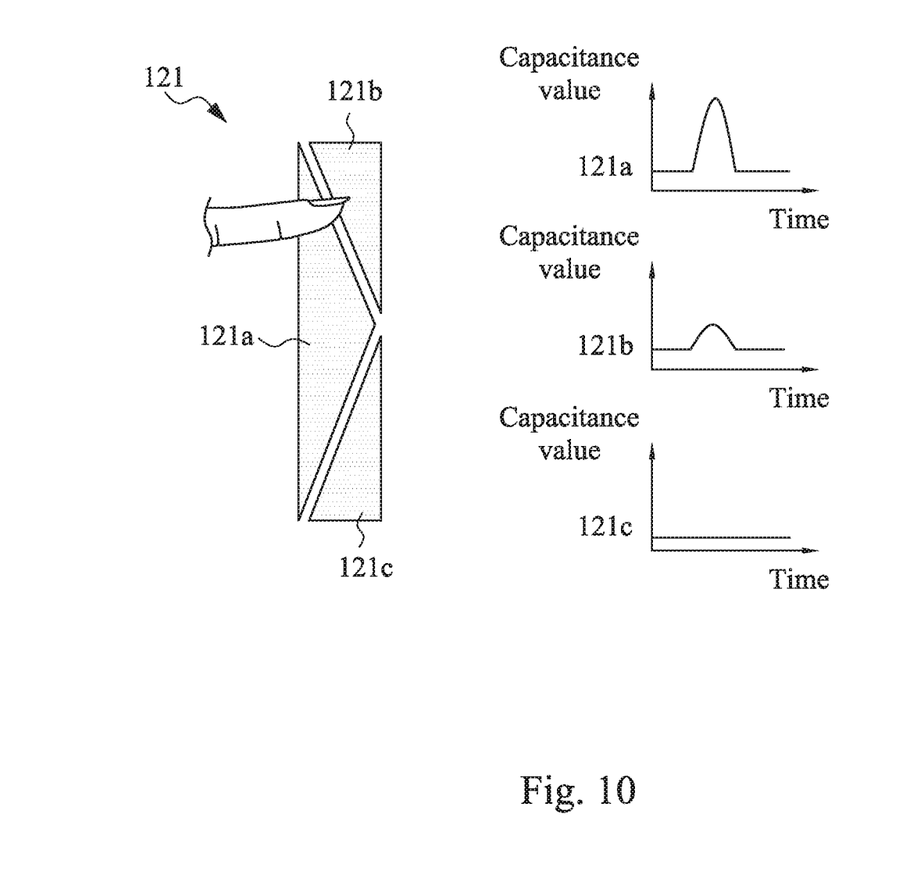
FIG. 10 is a schematic diagram showing how different parts of a sensing electrode group produce capacitance changes due to a touch.
Figure 11:
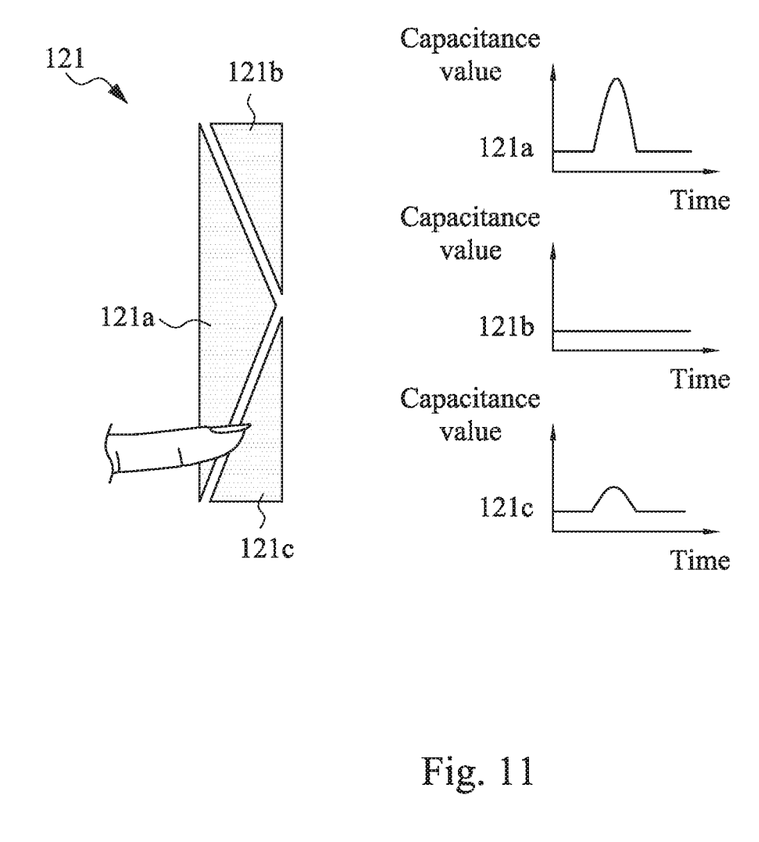
FIG. 11 is another schematic diagram showing how the different parts of the sensing electrode group produce capacitance changes due to a touch.
Figure 12:
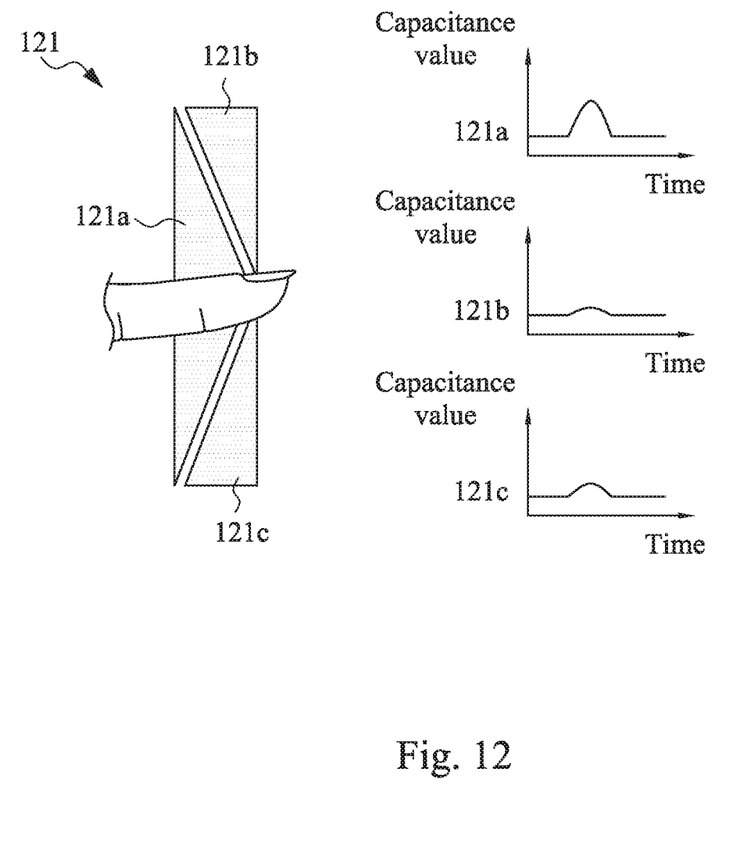
FIG. 12 is another schematic diagram showing how the different parts of the sensing electrode group produce capacitance changes due to a touch.

Reference is made to FIGS. 10 to 12. FIG. 10 is a schematic diagram showing how different parts of a sensing electrode group 121 produce capacitance changes due to a touch. FIG. 11 is another schematic diagram showing how the different parts of the sensing electrode group 121 produce capacitance changes due to a touch. FIG. 12 is another schematic diagram showing how the different parts of the sensing electrode group 121 produce capacitance changes due to a touch.

In step S103, the second axis coordinate of the touch point in the second axial direction A2 is calculated according to the capacitance changes of the first electrode block 121a and the second electrode block 121b or the capacitance changes of the first electrode block 121a and the third electrode block 121c.

If the control circuit 150 detects that the second electrode block 121b and the third electrode block 121c do not have the capacitance changes at the same time, the control circuit 150 can further evaluate whether the touch point falls on the upper half area of the sensing electrode group 121 (i.e., the area where the second electrode block 121b is located) or the lower half area of the sensing electrode group 121 (i.e., the area where the third electrode block 121c is located). For example, as shown in FIG. 10, if the control circuit 150 detects that the second electrode block 121b has a capacitance change and the third electrode block 121c does not have a capacitance change, the control circuit 150 can lock the analysis area in the upper half area of the sensing electrode group 121 and then accurately calculate the second axis coordinate of the touch point in the second axial direction A2 according to the capacitance changes of the first electrode block 121a and the second electrode block 121b. As shown in FIG. 11, if the control circuit 150 detects that the third electrode block 121c has a capacitance change and the second electrode block 121b does not have a capacitance change, the control circuit 150 can lock the analysis area in the lower half area of the sensing electrode group 121 and then accurately calculate the second axis coordinate of the touch point in the second axial direction A2 according to the capacitance changes of the first electrode block 121a and the third electrode block 121c.

In step S104, the second axis coordinate of the touch point in the second axial direction A2 is calculated according to the capacitance changes of the first electrode block 121a, the second electrode block 121b, and the third electrode block 121c.

If the control circuit 150 detects that the second electrode block 121b and the third electrode block 121c have the capacitance changes at the same time, the control circuit 150 can determine that the touch point is located at the central area of the sensing electrode group 121 (i.e., the intersection area of the first electrode block 121a, the second electrode block 121b, and the third electrode block 121c). Hence, the control circuit 150 can lock the analysis area in the central area of the sensing electrode group 121 and then accurately calculate the second axis coordinate of the touch point in the second axial direction A2 according to the capacitance changes of the first electrode block 121*a*, the second electrode block 121*b*, and the third electrode block 121*c*.

It can be seen from the above embodiments that the sensing electrode group 121 including the first electrode block 121*a*, the second electrode block 121*b*, and the third electrode block 121*c* allows the control circuit 150 to first learn whether the touch point is located in the upper half area, the lower half area, or the central area of the sensing electrode group 121, so that the calculation area of the control circuit 150 can be reduced by nearly half. Therefore, the electronic apparatus 100 or 200 can achieve more than twice the accuracy of a conventional touch device with an analog-to-digital converter (ADC) having the same resolution.

According to the foregoing recitations of the embodiments of the disclosure, it can be seen that in the touch display module of the present disclosure, the touch sensing layer embedded in the display panel includes the plurality of sensing electrode groups sequentially arranged along the first axial direction, and each of the sensing electrode groups includes the first electrode block, the second electrode block, and the third electrode block that are separated and arranged alternately in the second axial direction. In this way, compared to a conventional in-cell touch display with a plurality of rectangular touch electrodes arranged in a matrix, the electronic apparatus of the present disclosure can greatly reduce the number of traces from the touch sensing layer to the control circuit, thereby helping simplify the design of the touch chip, reduce the risk of short circuit between the electrode blocks of the touch sensing layer, and improve product reliability. In addition, since the number of the traces used is small, the touch sensing layer does not need to be coupled to the traces through via holes, which helps simplify the manufacturing processes and improve the production yield.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An in-cell touch display module, comprising:
a display panel; and
a touch sensing layer embedded in the display panel and comprising a plurality of sensing electrode groups, the sensing electrode groups being sequentially arranged along a first axial direction, one of the sensing electrode groups comprising a first electrode block, a second electrode block, a third electrode block, and a fourth electrode block spaced apart from each other, wherein the first electrode block is located at a same side of the second electrode block and the third electrode block in the first axial direction and is located between the second electrode block and the third electrode block in a second axial direction perpendicular to the first axial direction, the fourth electrode block is located between the second electrode block and the third electrode block in the second axial direction, and the second electrode block and the third electrode block are located between the first electrode block and the fourth electrode block in the first axial direction.

2. The in-cell touch display module of claim 1, wherein the display panel has a viewable area, and the second electrode block and the third electrode block extend toward each other respectively from opposite two edges of the viewable area.

3. The in-cell touch display module of claim 1, wherein the first electrode block and the second electrode block form a first gap there-between, the first electrode block and the third electrode block form a second gap there-between, and extending directions of the first gap and the second gap are inclined relative to the first axial direction and the second axial direction.

4. The in-cell touch display module of claim 3, wherein an end of the first gap is connected to an end of the second gap.

5. The in-cell touch display module of claim 3, wherein a contour of at least one of the first gap or the second gap is jagged.

6. The in-cell touch display module of claim 1, wherein the display panel has a viewable area, the one of the sensing electrode groups further comprises two conductive extending portions, and the two conductive extending portions are connected to one of the first electrode block, the second electrode block, or the third electrode block and extended outside the viewable area.

7. The in-cell touch display module of claim 1, wherein the first electrode block, the second electrode block, the third electrode block, and the fourth electrode block are arranged in a ring shape.

8. The in-cell touch display module of claim 1, wherein a peripheral contour of at least one of the first electrode block, the second electrode block, or the third electrode block is substantially triangular.

9. The in-cell touch display module of claim 1, wherein orthogonal projections of all sub-pixels of the display panel projected on the touch sensing layer are within ranges of the sensing electrode groups.

10. The in-cell touch display module of claim 1, wherein the display panel is a liquid crystal display panel or an organic light-emitting diode display panel.

11. An electronic apparatus, comprising:
an in-cell touch display module, comprising:
a display panel; and
a touch sensing layer embedded in the display panel and comprising a plurality of sensing electrode groups, the sensing electrode groups being sequentially arranged along a first axial direction, one of the sensing electrode groups comprising a first electrode block, a second electrode block, a third electrode block, and a fourth electrode block spaced apart from each other, wherein the first electrode block is located at a same side of the second electrode block and the third electrode block in the first axial direction and is located between the second electrode block and the third electrode block in a second axial direction perpendicular to the first axial direction, the fourth electrode block is located between the second electrode block and the third electrode block in the second axial direction, and the second electrode block and the third electrode block are located between the first electrode block and the fourth electrode block in the first axial direction; and
a cover plate disposed on the in-cell touch display module.

12. A touch position detection method, applied to an electronic apparatus comprising a plurality of sensing electrode groups, the sensing electrode groups being sequentially arranged along a first axial direction and each comprising a first electrode block, a second electrode block, and a third electrode block spaced apart from each other, wherein the first electrode block is located at a same side of the second electrode block and the third electrode block in the first axial direction and is located between the second electrode block and the third electrode block in a second axial direction perpendicular to the first axial direction, and the touch position detection method comprises:

obtaining a first axis coordinate of a touch point in the first axial direction according to one of the sensing electrode groups with a capacitance change; and calculating a second axis coordinate of the touch point in the second axial direction according to capacitance changes of at least two of the first electrode block, the second electrode block, or the third electrode block of the one of the sensing electrode groups.

13. The touch position detection method of claim 12, wherein the calculating the second axis coordinate comprises:

determining whether the second electrode block and the third electrode block have capacitance changes at the same time;

if the second electrode block and the third electrode block have the capacitance changes at the same time, calculating the second axis coordinate according to the capacitance changes of the first electrode block, the second electrode block, and the third electrode block; and if the second electrode block and the third electrode block do not have the capacitance changes at the same time, calculating the second axis coordinate according to the capacitance changes of the first electrode block and the second electrode block or the capacitance changes of the first electrode block and the third electrode block.

14. The in-cell touch display module of claim 1, comprising an upper substrate above the touch sensing layer.

15. The in-cell touch display module of claim 1, wherein the display panel comprises:

a thin film transistor layer above the touch sensing layer; and a liquid crystal layer above the thin film transistor layer.

16. The in-cell touch display module of claim 15, wherein the display panel comprises an insulating layer between the touch sensing layer and the thin film transistor layer.

17. The in-cell touch display module of claim 1, wherein the display panel comprises at least one of a liquid crystal layer or an organic light emitting layer over the touch sensing layer.

18. The in-cell touch display module of claim 1, wherein the display panel comprises:

an organic light emitting layer over the touch sensing layer; and a metal conductive layer over the organic light emitting layer.

19. The electronic apparatus of claim 11, wherein: the in-cell touch display module further comprises an upper substrate above the touch sensing layer, and the cover plate is above the upper substrate.

20. The electronic apparatus of claim 11, wherein the first electrode block, the second electrode block, the third electrode block, and the fourth electrode block are arranged in a ring shape.

* * * * *